US010077386B2

(12) United States Patent
Stanjek et al.

(10) Patent No.: US 10,077,386 B2
(45) Date of Patent: Sep. 18, 2018

(54) COMPOSITIONS ON THE BASIS OF ORGANYLOXYSILANE-TERMINATED POLYMERS

(71) Applicant: Wacker Chemie AG, Munich (DE)

(72) Inventors: Volker Stanjek, Ampfing (DE); Marko Prasse, Glaubitz (DE); Lars Zander, Altoetting (DE)

(73) Assignee: WACKER CHEMIE AG, Munich (DE)

( * ) Notice: Subject to any disclaimer, the term of this patent is extended or adjusted under 35 U.S.C. 154(b) by 0 days.

(21) Appl. No.: 15/417,396

(22) Filed: Jan. 27, 2017

(65) Prior Publication Data
US 2017/0137677 A1  May 18, 2017

Related U.S. Application Data

(63) Continuation of application No. 14/376,477, filed as application No. PCT/EP2013/051779 on Jan. 30, 2013, now abandoned.

(30) Foreign Application Priority Data

Feb. 6, 2012  (DE) .................. 10 2012 201 734

(51) Int. Cl.
| C09J 171/02 | (2006.01) |
| C09J 5/00 | (2006.01) |
| C08K 5/544 | (2006.01) |
| C08K 3/36 | (2006.01) |
| C08K 5/00 | (2006.01) |
| C08K 5/06 | (2006.01) |
| C08G 65/48 | (2006.01) |
| C08G 18/83 | (2006.01) |

(52) U.S. Cl.
CPC ............. *C09J 171/02* (2013.01); *C08K 5/544* (2013.01); *C09J 5/00* (2013.01); *C08G 18/837* (2013.01); *C08G 65/48* (2013.01); *C08K 3/36* (2013.01); *C08K 5/0016* (2013.01); *C08K 5/06* (2013.01); *C09J 2471/00* (2013.01)

(58) Field of Classification Search
None
See application file for complete search history.

(56) References Cited

U.S. PATENT DOCUMENTS

| 6,884,852 | B1 | 4/2005 | Klauck et al. |
| 7,319,128 | B2 | 1/2008 | Ziche et al. |
| 7,589,134 | B2 | 9/2009 | Pfenninger et al. |
| 8,101,704 | B2 | 1/2012 | Baumann et al. |
| 2002/0100550 | A1 | 8/2002 | Mahdi et al. |
| 2007/0167598 | A1 | 1/2007 | Stanjek et al. |
| 2007/0100111 | A1 | 5/2007 | Stanjek et al. |
| 2007/0287780 | A1 | 12/2007 | Wakabayashi et al. |
| 2008/0051517 | A1 | 2/2008 | Okai |
| 2008/0057316 | A1 | 3/2008 | Landon et al. |
| 2008/0245476 | A1 | 10/2008 | Loth et al. |
| 2009/0214879 | A1 | 8/2009 | Jucker et al. |
| 2009/0233033 | A1 | 9/2009 | Griswold |
| 2009/0311459 | A1 | 12/2009 | Griswold et al. |
| 2010/0087576 | A1 | 4/2010 | Prasse |
| 2010/0154991 | A1 | 6/2010 | Cagan et al. |
| 2010/0216950 | A1 | 8/2010 | Neuhausen et al. |
| 2012/0065308 | A1 | 3/2012 | Sumi |
| 2012/0165493 | A1 | 6/2012 | Stanjek et al. |
| 2012/0282444 | A1 | 11/2012 | Zander et al. |
| 2013/0048193 | A1 | 2/2013 | Gahlmann |
| 2014/0155545 | A1 | 6/2014 | Stanjek et al. |
| 2015/0007938 | A1 | 1/2015 | Stanjek et al. |

FOREIGN PATENT DOCUMENTS

| CN | 103748128 A1 | 4/2014 |
| DE | 102005054008 A1 | 5/2007 |
| DE | 102010034998 A1 | 2/2012 |
| EP | 1093482 B1 | 4/2001 |
| EP | 1535940 B1 | 6/2005 |
| EP | 1641854 B1 | 4/2006 |
| EP | 1896523 B1 | 3/2008 |
| EP | 1957553 B1 | 8/2008 |
| EP | 2172525 A1 | 4/2010 |
| JP | 2010-90381 | 4/2010 |
| WO | 99/31178 A1 | 6/1999 |
| WO | 2002090411 A1 | 11/2002 |
| WO | 03/068886 A1 | 8/2003 |
| WO | 2005000931 A1 | 1/2005 |
| WO | 2005108515 A1 | 11/2005 |
| WO | 2007054300 A1 | 5/2007 |
| WO | 2007085604 A1 | 8/2007 |
| WO | 2007085605 A1 | 8/2007 |
| WO | 2007085620 A1 | 8/2007 |
| WO | 2008027499 A2 | 3/2008 |
| WO | 2009/014077 A1 | 1/2009 |

(Continued)

OTHER PUBLICATIONS

Silicone Fluids—Heat-Resistance, Lubricating, Emulsifying; URL—http://www.chemiedidaktik.uni-wuppertal.de/disido_cy/en/info/structure/fluids.htm; Aug. 1, 2014; 6 pages.
Siliconöle—hitzebständig, schmierend, emulgierend (Silicone oils—heat resisitant, lubricating, emulsifying; XP-002699512; URL—http://www.chemiedidaktik.uni-wuppertal.de/disido_cy/de/info/structure/fluids.htm; Jun. 25, 2013; 11 pages.
Patent Data Sheet Socal U1S2, Nov. 2008.
Patent Data Sheet Cab-O-Sil M-5 Apr. 2004.
Brochure Ram Charan Company—Fumed Silica, Jan. 2012.
Patent Data Sheet Aerosil OX-50, Aug. 2013.
Momentive Performance Materials, Inc., Technical Information "Silquest A-2120". Sep. 2011.

*Primary Examiner* — Marc S Zimmer
(74) *Attorney, Agent, or Firm* — Brooks Kushman P.C.

(57) ABSTRACT

Moisture-curing adhesives simultaneously having high tensile strength and elongation are prepared by admixing a silane-terminated polyurethane or polyether polymer having a defined and limited molecular weight, finely divided silica, and an organosilicon compound containing basic nitrogen.

30 Claims, No Drawings

(56) References Cited

FOREIGN PATENT DOCUMENTS

| WO | 2009065950 A2 | 5/2009 |
|---|---|---|
| WO | 2010004038 A1 | 1/2010 |
| WO | 2011026658 A1 | 3/2011 |
| WO | 2011051056 A1 | 5/2011 |
| WO | 2013117471 A1 | 8/2013 |

COMPOSITIONS ON THE BASIS OF ORGANYLOXYSILANE-TERMINATED POLYMERS

CROSS-REFERENCE TO RELATED APPLICATIONS

This application is a continuation of U.S. application Ser. No. 14/376,477 filed Aug. 4, 2014, now pending, which, is the U.S. National Phase of PCT Appln. No. PCT/EP2013/051779 filed Jan. 30, 2013, which claims priority to German Application No. 10 2012 201 734.8 filed Feb. 6, 2012, the disclosures of which are incorporated in their entirety by reference herein.

BACKGROUND OF THE INVENTION

1. Field of the Invention

The invention relates to compositions based on silane-crosslinking prepolymers, to their methods of manufacture and to their use as adhesive and sealant materials, in particular for adhesive bonding of substrates.

2. Description of the Related Art

Polymer systems having reactive alkoxysilyl groups are well known. On contact with water and/or atmospheric humidity, these alkoxysilane-terminated polymers are able to condense with each other even at room temperature by elimination of the alkoxy groups. One of the most important applications for such materials is the manufacture of adhesives, particularly adhesive systems that are elastic.

In their cured state, adhesives based on alkoxysilane-crosslinking polymers not only exhibit good adherence properties to some substrates, but also very good mechanical properties, since they combine high tensile strength at break with high elasticity. A further decisive advantage of silane-crosslinking systems over numerous other adhesive and sealant technologies (over isocyanate-crosslinking systems, for example) is the fact that the prepolymers are toxicologically benign.

There are many applications where there is preference for single-component systems (1K systems) that cure on contact with atmospheric humidity. The decisive of single-component systems is particularly the fact that they are very easy to use, since there is no requirement here for the user to mix various components of the adhesive. In addition to saving work/time and safely obviating any dosage errors, single-component systems also do not impose a need to process the adhesive/sealant material within a usually fairly tight time window, as is the case with multi-component systems, after the multiple components have been mixed together.

What is disadvantageous with these systems as represented in the prior art, is particularly the low reactivity of the corresponding MS or SPUR polymers toward moisture, because this necessitates aggressive catalysis. The corresponding mixtures therefore typically contain appreciable amounts of toxicologically suspect tin catalysts.

The use of so-called α-silane-terminated prepolymers is advantageous here because they have reactive alkoxysilyl groups which are attached with a methylene spacer to an adjacent urethane unit. Compounds of this class are highly reactive in that they require neither tin catalysts nor strong acids or bases to provide high rates of cure on contact with air. Commercially available α-silane-terminated prepolymers are GENIOSIL® STP-E10 or -E30 from Wacker-Chemie AG.

However, most commonly used silane-crosslinking systems are disadvantageous, because although they do achieve moderate tensile strengths, typically on the order of 1-4 MPa, they only achieve tensile strengths >5 MPa with very great difficulty, if at all. Yet such higher tensile strengths are needed for numerous applications, for example for numerous structural adhesives, high-performance adhesives for DIY or home improver applications, or else for the adherent bonding of windshields. In addition to a high level of tensile strength, however, the adhesives in question should also exhibit high elasticities, i.e., elongations at break >100%.

One possible way to enhance the tensile strength of silane-crosslinking systems is to incorporate short-chain diols in silane-crosslinking polyurethanes, as described in WO 05/000931. However, even this measure only gives systems having moderately improved tensile strengths.

One of the few possible ways to achieve tensile strengths >5 MPa is to use carbon black as filler, as described in WO 02/090411 for example. However, the use of carbon black has the massive drawback that only black adhesives are obtainable. This is only acceptable to the particular users in very few adhesive applications. In addition, even the carbon black-containing formulations described in WO 02/090411 fail to achieve tensile strengths >6.5 MPa.

A further possible way to achieve very high tensile strengths with silane-crosslinking systems is described in WO 2011/026658. High tensile strengths are achieved here by the use of silane-terminated polyurethanes based on extremely short-chain polyols having molar masses <1000 g/mol. One consequence of this is that the resulting silane-crosslinking polymers possess not only a very high density of urethane and/or urea units capable of hydrogen bonding but also a correspondingly high number of crosslinkable silane end groups. However, systems of this type inevitably have three system-inherent disadvantages. First, the preparation of prepolymers having a high concentration of silane-crosslinking groups requires correspondingly large amounts of silane. These are generally the most cost-intensive prepolymer constituents, which causes a corresponding rise in the raw-material costs for these products. Second, the likewise necessary high concentration of urethane and/or urea groups which is needed to achieve high tensile strengths leads to very high prepolymer viscosities. So it is correspondingly problematic to compound these prepolymers into ready-formulated adhesives and also to work with these usually likewise comparatively highly viscous end products. Finally, the short chain lengths and high crosslink densities of the corresponding polymers lead to hard but also very inelastic materials having elongations at break far below 50%.

In addition to these disadvantages as regards properties, the polymer types described in WO 2011/026658 further also have the disadvantage of being commercially available to only a very limited extent, if at all.

A third possible way to achieve very high tensile strengths with silane-crosslinking systems is described in EP 1 957 553 A. The adhesive formulations described therein contain specific silane-terminated polyurethanes having an average chain length of about 7000 g/mol, pyrogenic silica of low BET surface area, and monomeric silanes, wherein the pyrogenic silica is used in amounts between 7 and 20 wt % and the monomeric silanes are used in amounts >10 wt %.

However, the comparatively low elongation at break for the corresponding adhesives is also a disadvantage. In addition, the systems described in EP 1 957 553 A have the disadvantage of being solely reliant on silane-crosslinking types of polymers which are not commercially available.

SUMMARY OF THE INVENTION

It has now been unexpectedly and surprisingly discovered that moisture curable adhesives exhibiting high tensile strength and elongation can be prepared from silane crosslinking base polymers having a number average molecular weight of >8000 g/mol, and 16-50 weight percent of finely divided silica.

DETAILED DESCRIPTION OF THE PREFERRED EMBODIMENT

The invention thus provides compositions (M) comprising
(A) silane-crosslinking polymers of the formula

$$Y-[(CR^1_2)_b-SiR_a(OR^2)_{3-a}]_x \qquad (I)$$

where
Y represents a polymer residue which is x-valent, bonded via nitrogen, oxygen, sulfur or carbon,
R each individually represents a monovalent, optionally substituted hydrocarbyl radical,
$R^1$ each individually represents hydrogen or a monovalent, optionally substituted hydrocarbyl radical optionally attached to the carbon atom via nitrogen, phosphorus, oxygen, sulfur or a carbonyl group,
$R^2$ each individually represents hydrogen or a monovalent, optionally substituted hydrocarbyl radical,
x is an integer from 1 to 10, preferably 1, 2 or 3, more preferably 2 or 3, most preferably 2,
a each individually is 0, 1 or 2, preferably 0 or 1, and
b each individually is an integer from 1 to 10, preferably 1, 3 or 4, more preferably 1 or 3, in particular 1, and
(B) finely divided silica,
with the proviso that silane-crosslinking polymers (A) have an average molar mass $M_n$ (number average) of at least 8000 g/mol and that composition (M) comprises finely divided silica in an amount of 16 to 50 wt %, based on the overall weight of composition (M).

The number-average molar mass $M_n$ was determined using size exclusion chromatography (SEC) against a polystyrene standard, in THF, at 60° C., flow rate 1.2 ml/min and detection with RI (refractive index detector) on a Styragel HR3-HR4-HR5-HR5 column set from Waters Corp. USA with an injection volume of 100 μl.

The invention rests on the surprising discovery that the formulations of the present invention make possible the use of long-chain, and hence correspondingly high molecular weight, silane-crosslinking polymers as needed to achieve high elasticities, i.e., elongations at break >100%, without their use automatically leading to very moderate tensile strengths, i.e., to tensile strengths below 5 MPa. Thus, the systems of the present invention make possible the development of adhesives combining high tensile strength with high elasticity.

Examples of R radicals are alkyl radicals such as methyl, ethyl, n-propyl, isopropyl, 1-n-butyl, 2-n-butyl, isobutyl, tert-butyl, n-pentyl, isopentyl, neopentyl, and tert-pentyl; hexyl radicals such as n-hexyl; heptyl radicals such as n-heptyl; octyl radicals such as n-octyl, isooctyl and 2,2,4-trimethylpentyl; nonyl radicals such as n-nonyl; decyl radicals such as n-decyl; dodecyl radicals such as n-dodecyl; octadecyl radicals such as n-octadecyl; cycloalkyl radicals such as cyclopentyl, cyclohexyl, cycloheptyl and methylcyclohexyl; alkenyl radicals such as vinyl, 1-propenyl and 2-propenyl; aryl radicals such as phenyl, naphthyl, anthryl and phenanthryl; alkaryl radicals such as o-, m-, p-tolyl xylyl and ethylphenyl; and aralkyl radicals such as benzyl, α-phenylethyl and β-phenylethyl.

Examples of substituted R radicals are haloalkyl radicals such as 3,3,3-trifluoro-n-propyl, 2,2,2,2',2',2'-hexafluoroisopropyl and heptafluoroisopropyl, and haloaryl radicals, such as o-, m- and p-chlorophenyl.

The R radicals are preferably monovalent hydrocarbyl radicals of 1 to 6 carbon atoms, optionally substituted with halogen atoms, more preferably alkyl radicals of 1 or 2 carbon atoms, especially methyl.

Examples of $R^1$ radicals are hydrogen, the radicals recited for R and also optionally substituted hydrocarbyl radicals attached to the carbon atom via nitrogen, phosphorus, oxygen, sulfur, carbon or a carbonyl group. It is preferable for the $R^1$ radical to represent hydrogen or hydrocarbyl radicals of 1 to 20 carbon atoms, particularly, hydrogen.

Examples of the $R^2$ radical are hydrogen or the examples recited for the R radical.

The $R^2$ radical is preferably hydrogen or an alkyl radical of 1 to 10 carbon atoms optionally substituted with halogen atoms, more preferably alkyl radicals of 1 to 4 carbon atoms, and especially methyl or ethyl.

Y represents the residue of any polymer where, for the purposes of the present invention, at least 50%, preferably at least 70% and more preferably at least 90% of all bonds in the main chain are carbon-carbon, carbon-nitrogen or carbon-oxygen bonds. Examples of Y polymer residues are polyester, polyether, polyurethane, polyalkylene and polyacrylate residues.

The polymer residue Y is preferably an organic polymer residue where the polymer chain comprises polyoxyalkylenes such as polyoxyethylene, polyoxypropylene, polyoxybutylene, polyoxytetramethylene, polyoxyethylene-polyoxypropylene copolymer and polyoxypropylene-polyoxybutylene copolymer; hydrocarbon polymers such as polyisobutylene and copolymers of polyisobutylene with isoprene; polychloroprenes; polyisoprenes; polyurethanes; polyesters; polyamides; polyacrylates; polymethacrylates; vinyl polymer and polycarbonates; and where the attachment to the $-[(CR^1_2)_b-SiR_a(OR^2)_{3-a}]$ group or groups is preferably via $-O-C(=O)-NH-$, $-NH-C(=O)O-$, $-NH-C(=O)-NH-$, $-NR'-C(=O)-NH-$, $NH-C(=O)-NR'-$, $-NH-C(=O)-$, $-C(=O)-NH-$, $-C(=O)-O-$, $-O-C(=O)-$, $-O-C(=O)-O-$, $-S-C(=O)-NH-$, $-NH-C(=O)-S-$, $-C(=O)-S-$, $-S-C(=O)-$, $-S-C(=O)-S-$, $-C(=O)-$, $-S-$, $-O-$, $-NR'-$, wherein R', which may be the same or different in each occurrence, has a meaning recited for R or represents a $-CH(COOR")-CH_2-COOR"$ group in which R", which may be the same or different in each occurrence, has a meaning recited for R.

The R' radical is preferably a $-CH(COOR")-CH_2-COOR"$ group or an optionally substituted hydrocarbyl radical of 1 to 20 carbon atoms, more preferably a linear, branched or cyclic alkyl group of 1 to 20 carbon atoms or an aryl group of 6 to 20 carbon atoms which is optionally substituted with halogen atoms.

Examples of R' radicals are cyclohexyl, cyclopentyl, n-propyl, isopropyl, n-butyl, isobutyl, t-butyl, the various stereoisomers of the pentyl radical, of the hexyl radical or of the heptyl radical, and also phenyl.

The R" radicals are preferably alkyl groups of 1 to 10 carbon atoms, more preferably methyl, ethyl or propyl.

The $-[(CR^1_2)_b-SiR_a(OR^2)_{3-a}]$ groups attached as described may be present in component (A) at any desired position of the polymer chain, for instance internally and/or terminally.

Polymers (A) are obtainable via known methods, such as addition reactions, e.g., hydrosilylation, Michael addition, Diels-Alder addition or reactions between isocyanate-functional compounds with compounds having isocyanate-reactive groups, the latter being preferred.

It is particularly preferable for the Y residue in formula (I) to represent polyurethane residues and polyoxyalkylene residues, especially polyoxyalkylene residues.

When Y represents polyurethane residues it preferably represents polyurethane residues whose chain ends are attached to the —[(CR$^1$$_2$)$_b$—SiR$_a$(OR$^2$)$_{3-a}$] group or groups via —NH—C(=O)O—, —NH—C(=O)—NH—, —NR'—C(=O)—NH— or —NH—C(=O)—NR'—, in particular via —O—C(=O)—NH— or —NH—C(=O)—NR'—, while all the radicals and indices have one of the abovementioned meanings. The polyurethane residues Y are obtainable with preference from linear or branched polyoxyalkylenes, in particular from polypropylene glycols, and di- or polyisocyanates. Average molar masses $M_n$ of Y residues are preferably in the range from 10,000 to 30,000 g/mol and more preferably in the range from 11,000 to 20,000 g/mol. Suitable methods of preparing a corresponding component (A) and also examples of component (A) itself are described inter alia in EP 1 093 482 B1 (paragraphs [0014]-[0023], [0039]-[0055] and also Example 1 and Comparative Example 1) or EP 1 641 854 B1 (paragraphs [0014]-[0035], Examples 4 and 6 and also Comparative Examples 1 and 2), or their U.S. equivalents, U.S. Pat. No. 6,884,852 and U.S. Published Application 2007/0167598, which are incorporated herein by reference.

When Y represents polyoxyalkylene residues, it preferably represents linear or branched polyoxyalkylene residues, more preferably polyoxypropylene residues whose chain ends are preferably attached to the —[(CR$^1$$_2$)$_b$—SiR$_a$(OR$^2$)$_{3-a}$] group or groups via —O—C(=O)—NH—. The average molar masses $M_n$ of polyoxyalkylene residues Y are preferably in the range from 10,000 to 30,000 g/mol, more preferably in the range from 11,000 to 20,000 g/mol. Suitable methods of preparing an appropriate component (A) and also examples of component (A) itself are described inter alia in EP 1 535 940 B1 (paragraphs [0005]-[0025] (U.S. Pat. No. 7,319,128) and also Examples 1-3 and Comparative Examples 1-4) or EP 1 896 523 B1 (paragraphs [0008]-[0047]) (U.S. Pat. No. 8,101,704), which are incorporated hereby by reference.

The end groups of compounds (A) used for the purposes of the present invention are preferably those of general formulae

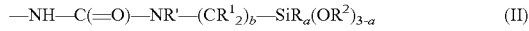
—NH—C(=O)—NR'—(CR$^1$$_2$)$_b$—SiR$_a$(OR$^2$)$_{3-a}$ (II)

and

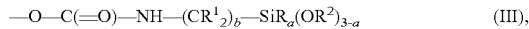
—O—C(=O)—NH—(CR$^1$$_2$)$_b$—SiR$_a$(OR$^2$)$_{3-a}$ (III), where the radicals and indices have any of the meanings recited therefor above.

The end groups of compounds (A) used for the purposes of the present invention are more preferably those of formula (III).

Component (A) is preferably a silane-terminated polyoxyalkylene, more preferably a silane-terminated polyoxypropylene, having end groups of formula (III), where R$^1$ represents a hydrogen atom, R represents methyl, R$^2$ represents methyl or ethyl, b represents 1 or 3 and a represents 0 or 1. The silane-terminated polyoxyalkylenes preferably contain exclusively polyether units in addition to the end groups (III). The number of end groups of formula (III) per molecule of polymers (A) according to the present invention is preferably 2 or 3, more preferably 2.

An immense advantage of silane-terminated polyoxyalkylenes having end groups of formula (III) over silane-terminated polyoxyalkylenes having different end groups is their sheer simplicity of preparation, via a reaction of common, hydroxyl-terminated polyoxyalkylenes and silanes of the formula

OCN—(CR$^1$$_2$)$_b$—SiR$_a$(OR$^2$)$_{3-a}$ (IV)

where all the radicals and indices have any of the abovementioned meanings. What is decisive in this connection is that this reaction provides for a substantially complete termination of existing chain ends, making this method significantly different from other methods, for example a hydrosilylation of □, □-unsaturated polymers with SiH-functional silanes.

This substantially complete termination leads—surprisingly—to distinctly better properties, in particular to distinctly better tensile strengths, for the compositions (M) comprising the polymers (A), versus polymers whose end groups were synthesized in some other way, for example via hydrosilylation.

The proportion of chain ends terminated with end groups of formula (III) in the silane-terminated polymers (A) is preferably at least 85%, more preferably at least 90% and especially at least 95%. Preference for use as component (A) is given in particular to linear polyoxypropylenes whose chains are terminated with end groups of formula (III) to an extent of at least 85%, more preferably to an extent of at least 90% and especially to an extent of at least 95%.

The average molecular weights $M_n$ of compounds (A) are preferably at least 10,000 g/mol, more preferably at least 11,000 g/mol and preferably at most 30,000 g/mol, more preferably at most 24,000 g/mol, and especially at most 22,000 g/mol.

The viscosity of compounds (A) is preferably at least 0.2 Pas, more preferably at least 1 Pas and even more preferably at least 5 Pas, and preferably at most 700 Pas, more preferably at most 100 Pas, all measured at 20° C.

Component (A) as used for the purposes of the present invention may comprise just one species of formula (I) compounds as well as mixtures of different species of formula (I) compounds. In effect, component (A) may exclusively comprise formula (I) compounds in which more than 90%, preferably more than 95% and more preferably more than 98% of all silyl groups attached to the A residue are identical. However, it is also possible to use a component (A) comprising at least in part formula (I) compounds wherein different silyl groups are attached to an A residue. Finally, component (A) may also comprise mixtures of various formula (I) compounds comprising altogether at least 2 different species of silyl groups attached to A residues provided, however, that all the silyl groups attached to any one A residue are identical.

When component (A) comprises various species of formula (I) compounds, preference is given to mixtures comprising not only compounds (A1) having end groups of formula (II) or (III) where b=1, R$^1$=H and a=0 or 1 in each but also compounds (A2) having end groups of formula (II) or (III) where b=3, R$^1$=H and a=0 in each of which, and particular preference is given to those in which the weight ratio of (A1) to (A2) is in the range from 0.1 to 10, preferably from 0.2 to 5.

Compounds (A) as used for the purposes of the present invention are commercially available products or are obtainable by common chemical methods. Examples of commercially available compounds (A) are the products GENIOSIL® STP-E 10, STP-E 15, STP-E 30 or STP-E 35 from Wacker Chemie AG.

The compositions (M) of the present invention preferably comprise compounds (A) in concentrations of at most 75 wt %, more preferably at most 65 wt % and preferably at least 10 wt %, more preferably at least 15 wt %, all based on the overall weight of composition (M).

Finely divided silica (B) as used for the purposes of the present invention preferably comprises pyrogenic silica. Not only hydrophilic but also hydrophobic types of silica can be used in this case.

BET surface areas of silicas (B) used for the purposes of the present invention are preferably between 35 and 400 m²/g and more preferably between 50 and 200 m²/g.

Average particle sizes for the silicas (B) used for the purposes of the present invention are preferably between 1 and 40 □m and more preferably between 5 and 25 □m.

Examples of component (B) are finely divided pyrogenic silicas obtainable under the trade names HDK® 2000, HDK® D 05 or HDK® C 10 from Wacker Chemie AG, D-Munich.

Silicas (B) used for the purposes of the present invention are commercially available products or are obtainable by common chemical methods.

Silicas (B) used for the purposes of the present invention preferably have a moisture content of below 1 wt %, more preferably below 0.5 wt %.

In one preferred embodiment of the invention, the finely divided silica (B) is present in the compositions (M) of the present invention in concentrations of at least 19 wt %, more preferably at least 24 wt %, both based on the overall weight of composition (M). The finely divided silica (B) is preferably present in the compositions (M) of the present invention in amounts of at most 40 wt %, more preferably in amounts of at most 35 wt %, both based on the overall weight of composition (M).

The compositions of the present invention, in addition to polymers (A) and the finely divided silica (B), may comprise still further components, for example nonreactive plasticizers (C), basic nitrogen organosilicon compounds (D), further fillers (E), silicone resins (F), catalysts (G), adhesion promoters (H), water scavengers (I), additives (J) and admixture agents (K).

In a further preferred embodiment of the invention, the compositions (M) of the present invention, in addition to polymers (A) and silica (B), which are present in the composition (M) in an amount of at least 19 wt %, more preferably at least 24 wt %, further comprise at least one nonreactive plasticizer (C), while all wt % particulars are based on the overall weight of composition (M).

The compositions (M) of the present invention optionally comprise plasticizer (C) in concentrations of preferably at least 5 wt %, more preferably at least 10 wt %, both based on the overall weight of composition (M). The compositions (M) of the present invention preferably comprise plasticizer (C) in amounts of at most 50 wt %, more preferably in amounts of at most 40 wt %, in particular of at most 30 wt %, all based on the overall weight of composition (M).

This preferred embodiment of the invention rests on the exceedingly surprising discovery that adding a plasticizer in the amounts recited as preferred and as particularly preferred affects the tensile shear strength of the cured compositions (M) positively and not, as ought to have been expected, negatively.

Plasticizer (C) preferably comprises phthalic esters, adipic esters, benzoic esters, glycol esters, esters of saturated alkanediols, phosphoric esters, sulfonic esters, polyesters, polyethers, polystyrenes, polybutadienes, polyisobutylenes, paraffinic hydrocarbons and high molecular weight branched hydrocarbons.

Examples of plasticizers (C) optionally used for the purposes of the present invention are phthalic esters, e.g., dioctyl phthalate, diisooctyl phthalate and diundecyl phthalate; perhydrogenated phthalic esters, e.g., diisononyl 1,2-cyclohexanedicarboxylate and dioctyl 1,2-cyclohexanedicarboxylate; adipic esters, e.g., dioctyl adipate; benzoic esters; glycol esters; esters of saturated alkanediols, e.g., 2,2,4-trimethyl-1,3-pentanediol monoisobutyrates and 2,2,4-trimethyl-1,3-pentanediol diisobutyrates; phosphoric esters; sulfonic esters; polyesters; polyethers, e.g., polyethylene glycols, polytetrahydrofuran and polypropylene glycols having molar masses of preferably 200 to 22,000 g/mol; polystyrenes; polybutadienes; polyisobutylenes; paraffinic hydrocarbons; and high molecular weight branched hydrocarbons.

Preference is given to plasticizers (C) having molar masses—or in the case of polymeric plasticizers, average molar masses $M_n$—of above 200 g/mol, more preferably of above 500 g/mol, especially of above 900 g/mol. Preferably, they have molar masses, or average molar masses Mn, of less than a maximum of 20 000 g/mol, more preferably of not more than 10,000 g/mol, especially at most 8000 g/mol.

It is particularly preferable for plasticizer (C) to comprise polyethers, especially polyethylene glycols, polytetrahydrofuran and polypropylene glycols, most preferably polypropylene glycols. The preferred polyethers (C) preferably have molar masses of between 400 and 22,000 g/mol, more preferably between 800 and 12,000 g/mol and especially between 1000 and 8000 g/mol.

The compositions (M) of the present invention may optionally comprise a basic nitrogen organosilicon compound (D). Preferably component (D) comprises organosilicon compounds comprising units of the formula

$$D_c Si(OR^3)_d R^4_e O_{(4-c-d-e)/2} \tag{V}$$

where

R³ each individually represents hydrogen or an optionally substituted hydrocarbyl radicals, D each individually represents a monovalent SiC-bonded radical with basic nitrogen, R⁴ each individually represents a monovalent, optionally substituted SiC-bonded organic radical free from basic nitrogen, c is 0, 1, 2, 3 or 4, preferably 1, d is 0, 1, 2 or 3, preferably 1, 2 or 3, more preferably 2 or 3, and e is 0, 1, 2 or 3, preferably 1 or 0, with the proviso that the sum total of c+d+e is not more than 4 and at least one D radical is present per molecule.

Organosilicon compounds (D) optionally used for the purposes of the present invention may comprise not only silanes, i.e., compounds of formula (V) where c+d+e=4, but also siloxanes, i.e., compounds comprising units of formula (V) where c+d+e≤3, preferably silanes.

Examples of optionally substituted hydrocarbyl radicals R³ are the examples recited for the radical R.

The R³ radicals preferably represent hydrogen or hydrocarbyl radicals of 1 to 18 carbon atoms optionally substituted with halogen atoms, more preferably hydrogen or hydrocarbyl radicals of 1 to 10 carbon atoms, in particular methyl and ethyl.

Examples of $R^4$ are the examples recited for R.

$R^4$ is preferably a hydrocarbyl radical of 1 to 18 carbon atoms optionally substituted with halogen atoms, more preferably a hydrocarbyl radical of 1 to 5 carbon atoms, especially methyl.

Examples of D are radicals of the formulae $H_2N(CH_2)_3$—, $H_2N(CH_2)_2NH(CH_2)_3$—, $H_2N(CH_2)_2NH(CH_2)_2NH(CH_2)_3$—, $H_3CNH(CH_2)_3$—, $C_2H_5NH(CH_2)_3$—, $C_3H_7NH(CH_2)_3$—, $C_4H_9NH(CH_2)_3$—, $C_5H_{11}NH(CH_2)_3$, $C_6H_{13}NH(CH_2)_3$—, $C_7H_{15}NH(CH_2)_3$—, $H_2N(CH_2)_4$—, $H_2N$-$CH_2$—$CH(CH_3)$—$CH_2$—, $H_2N(CH_2)_5$—, cyclo-$C_5H_9NH(CH_2)_3$—, cyclo-$C_6H_{11}NH(CH_2)_3$—, phenyl-$NH(CH_2)_3$—, $(CH_3)_2N(CH_2)_3$—, $(C_2H_5)_2N(CH_2)_3$—, $(C_3H_7)_2NH(CH_2)_3$—, $(C_4H_9)_2NH(CH_2)_3$—, $(C_5H_{11})_2NH(CH_2)_3$—, $(C_6H_{13})_2NH(CH_2)_3$—, $(C_7H_{15})_2NH(CH_2)_3$—, $H_2N(CH_2)$—, $H_2N(CH_2)_2NH(CH_2)$—, $H_2N(CH_2)_2NH(CH_2)_2NH(CH_2)$—, $H_3CNH(CH_2)$—, $C_2H_5NH(CH_2)$—, $C_3H_7NH(CH_2)$—, $C_4H_9NH(CH_2)$—, $C_5H_{11}NH(CH_2)$—, $C_6H_{13}NH(CH_2)$—, $C_7H_{15}NH(CH_2)$—, cyclo-$C_5H_9NH(CH_2)$—, cyclo-$C_6H_{11}NH(CH_2)$—, phenyl-$NH(CH_2)$—, $(CH_3)_2N(CH_2)$—, $(C_2H_5)_2N(CH_2)$—, $(C_3H_7)_2NH(CH_2)$—, $(C_4H_9)_2NH(CH_2)$—, $(C_5H_{11})_2NH(CH_2)$—, $(C_6H_{13})_2NH(CH_2)$—, $(C_7H_{15})_2NH(CH_2)$—, $(CH_3O)_3Si(CH_2)_3NH(CH_2)_3$—, $(C_2H_5O)_3Si(CH_2)_3NH(CH_2)_3$—, $(CH_3O)_2(CH_3)Si(CH_2)_3NH(CH_2)_3$— and $(C_2H_5O)_2(CH_3)Si(CH_2)_3NH(CH_2)_3$— and also reaction products of the abovementioned primary amino groups with compounds comprising epoxy groups or double bonds reactive toward primary amino groups.

Radical D is preferably a $H_2N(CH_2)_3$—, $H_2N(CH_2)_2NH(CH_2)_3$—or cyclo-$C_6H_{11}NH(CH_2)_3$—radical.

Examples of formula (V) silanes optionally used for the purposes of the present invention are $H_2N(CH_2)_3$—Si$(OCH_3)_3$, $H_2N(CH_2)_3$—Si$(OC_2H_5)_3$, $H_2N(CH_2)_3$—Si$(OCH_3)_2CH_3$, $H_2N(CH_2)_3$—Si$(OC_2H_5)_2CH_3$, $H_2N(CH_2)_2NH(CH_2)_3$—Si$(OCH_3)_3$, $H_2N(CH_2)_2NH(CH_2)_3$—Si$(OC_2H_5)_3$, $H_2N(CH_2)_2NH(CH_2)_3$—Si$(OCH_3)_2CH_3$, $H_2N(CH_2)_2NH(CH_2)_3$—Si$(OC_2H_5)_2CH_3$, $H_2N(CH_2)_2NH(CH_2)_3$—Si$(OH)_3$, $H_2N(CH_2)_2NH(CH_2)_3$—Si$(OH)_2CH_3$, $H_2N(CH_2)_2NH(CH_2)_2NH(CH_2)_3$—Si$(OCH_3)_3$, $H_2N(CH_2)_2NH(CH_2)_2NH(CH_2)_3$—Si$(OC_2H_5)_3$, cyclo-$C_6H_{11}NH(CH_2)_3$—Si$(OCH_3)_3$, cyclo-$C_6H_{11}NH(CH_2)_3$—Si$(OC_2H_5)_3$, cyclo-$C_6H_{11}NH(CH_2)_3$—Si$(OCH_3)_2CH_3$, cyclo-$C_6H_{11}NH(CH_2)_3$—Si$(OC_2H_5)_2CH_3$, cyclo-$C_6H_{11}NH(CH_2)_3$—Si$(OH)_3$, cyclo-$C_6H_{11}NH(CH_2)_3$—Si$(OH)_2CH_3$, phenyl-$NH(CH_2)_3$—Si$(OCH_3)_3$, phenyl-$NH(CH_2)_3$—Si$(OC_2H_5)_3$, phenyl-$NH(CH_2)_3$—Si$(OCH_3)_2CH_3$, phenyl-$NH(CH_2)_3$—Si$(OC_2H_5)_2CH_3$, phenyl-$NH(CH_2)_3$—Si$(OH)_3$, phenyl-$NH(CH_2)_3$—Si$(OH)_2CH_3$, $HN((CH_2)_3$—Si$(OCH_3)_3)_2$, $HN((CH_2)_3$—Si$(OC_2H_5)_3)_2$, $HN((CH_2)_3$—Si$(OCH_3)_2CH_3)_2$, $HN((CH_2)_3$—Si$(OC_2H_5)_2CH_3)_2$, cyclo-$C_6H_{11}NH(CH_2)$—Si$(OCH_3)_3$, cyclo-$C_6H_{11}NH(CH_2)$—Si$(OC_2H_5)_3$, cyclo-$C_6H_{11}NH(CH_2)$—Si$(OCH_3)_2CH_3$, cyclo-$C_6H_{11}NH(CH_2)$—Si$(OC_2H_5)_2CH_3$, cyclo-$C_6H_{11}NH(CH_2)$—Si$(OH)_3$, cyclo-$C_6H_{11}NH(CH_2)$—Si$(OH)_2CH_3$, phenyl-$NH(CH_2)$—Si$(OCH_3)_3$, phenyl-$NH(CH_2)$—Si$(OC_2H_5)_3$, phenyl-$NH(CH_2)$—Si$(OCH_3)_2CH_3$, phenyl-$NH(CH_2)$—Si$(OC_2H_5)_2CH_3$, phenyl-$NH(CH_2)$—Si$(OH)_3$ and phenyl-$NH(CH_2)$—Si$(OH)_2CH_3$ and also their partial hydrolyzates, while $H_2N(CH_2)_2NH(CH_2)_3$—Si$(OCH_3)_3$, $H_2N(CH_2)_2NH(CH_2)_3$—Si$(OC_2H_5)_3$, $H_2N(CH_2)_2NH(CH_2)_3$—Si$(OCH_3)_2CH_3$, cyclo-$C_6H_{11}NH(CH_2)_3$—Si$(OCH_3)_3$, cyclo-$C_6H_{11}NH(CH_2)_3$—Si$(OC_2H_5)_3$ and cyclo-$C_6H_{11}NH(CH_2)_3$—Si$(OCH_3)_2CH_3$ and also their respective partial hydrolyzates are preferred and $H_2N(CH_2)_2NH(CH_2)_3$—Si$(OCH_3)_3$, $H_2N(CH_2)_2NH(CH_2)_3$—Si$(OCH_3)_2CH_3$, cyclo-$C_6H_{11}NH(CH_2)_3$—Si$(OCH_3)_3$, cyclo-$C_6H_{11}NH(CH_2)_3$—Si$(OCH_3)_2CH_3$ and also their respective partial hydrolyzates are particularly preferred.

The organosilicon compounds (D) optionally used for the purposes of the present invention may also take on the function of a curing catalyst or cocatalyst in the compositions (M) of the present invention.

The organosilicon compounds (D) optionally used for the purposes of the present invention can further act as adhesion promoters and/or as water scavengers.

The organosilicon compounds (D) optionally used for the purposes of the present invention are commercially available products and/or obtainable by common chemical methods.

When the compositions (M) of the present invention do comprise component (D), the amounts are preferably 0.01 to 25 parts by weight, more preferably 0.1 to 10 parts by weight, especially 0.5 to 5 parts by weight, all based on 100 parts by weight of mixture (A). The compositions (M) of the present invention preferably do comprise component (D).

Fillers (E) as optionally used in the compositions (M) of the present invention may comprise any desired previously known fillers different from component (B).

Examples of fillers (E) are nonreinforcing fillers, i.e., fillers preferably having a BET surface area of up to 50 m$^2$/g, such as quartz, diatomaceous earth, calcium silicate, zirconium silicate, talc, kaolin, zeolites, metal oxide powder, such as the oxides of and of the mixed oxides between aluminum, titanium, iron or zinc, barium sulfate, calcium carbonate, gypsum, silicon nitride, silicon carbide, boron nitride, glass powder and plastics powder, such as polyacrylonitrile powder; reinforcing fillers, i.e., fillers having a BET surface area of more than 50 m$^2$/g, such as precipitated chalk, carbon black, such as furnace and acetylene blacks and silicon-aluminum mixed oxides of large BET surface area; aluminum trihydroxide, fillers in the form of hollow beads, such as ceramic microbeads, for example those obtainable under the trade name Zeeospheres™ from 3M Deutschland GmbH in D-Neuss, elastic polymeric beads, for example those available under the trade name of EXPANCEL® from AKZO NOBEL, Expancel in Sundsvall, Sweden, or glass beads; fibrous fillers, such as asbestos and also polymeric fibers. The recited fillers may be in a hydrophobicized state, for example due to treatment with organosilanes/organosiloxanes or with stearic acid or etherification of hydroxyl groups into alkoxy groups.

When the compositions (M) of the present invention do comprise fillers (E), calcium carbonate, talc and aluminum trihydroxide are preferably concerned.

Optionally employed fillers (E) preferably have a moisture content of below 1 wt %, more preferably of below 0.5 wt %.

When the compositions (M) of the present invention do comprise fillers (E), the amounts are preferably 10 to 1000 parts by weight, more preferably 50 to 500 parts by weight and especially 70 to 200 parts by weight, all based on 100 parts by weight of constituent (A). Preferably, the compositions (M) of the present invention comprise no fillers (E).

The compositions (M) of the present invention are preferably substantially transparent.

Silicone resins (F) optionally used in the compositions (M) of the present invention preferably comprise compounds, other than components (A) and (D), comprising units of the formula $$R^5{}_f(R^6O)_g SiO_{(r-f-g)/2} \qquad (VI),$$

where
- $R^5$ each individually is hydrogen or a monovalent, SiC-bonded, optionally substituted hydrocarbyl radical,
- $R^6$ each individually represents a hydrogen atom or a monovalent, optionally substituted hydrocarbyl radical,
- f is 0, 1, 2 or 3, and
- g is 0, 1, 2 or 3, preferably 0, 1 or 2, more preferably 0 or 1, with the proviso that the sum total of f+g is not more than 3 and that f represents 0 or 1 in at least 50%, preferably at least 60%, of the units of formula (VI).

Component (F) preferably comprises at least 90 wt % of units of formula (VI). It is particularly preferable for component (F) to consist exclusively of units of formula (VI).

Examples of radicals $R^5$ are the examples recited above for R.

Radical $R^5$ preferably represents monovalent SiC-bonded aliphatic or aromatic hydrocarbyl radicals of 1 to 18 carbon atoms optionally substituted with halogen atoms, more preferably methyl or phenyl. It is preferably at least 40% and more preferably at least 50% of the units of formula (VI) which have phenyl $R^5$.

Examples of radical $R^6$ are hydrogen or the examples recited for radical R. Radical $R^6$ preferably represents hydrogen or alkyl radicals of 1 to 10 carbon atoms optionally substituted with halogen atoms, more preferably methyl or ethyl.

Examples of silicone resins useful as components (F) are organopolysiloxane resins consisting essentially, preferably exclusively, of (Q) units of the formulae $SiO_{4/2}$, $Si(OR^6)O_{3/2}$, $Si(OR^6)_2O_{2/2}$ and $Si(OR^6)_3 O_{1/2}$, (T) units of the formulae $PhSiO_{3/2}$, $PhSi(OR^6)O_{2/2}$ and $PhSi(OR^6)_2O_{1/2}$, (D) units of the formulae $Me_2SiO_{2/2}$ and $Me_2Si(OR^6)O_{1/2}$ and also (M) units of the formula $Me_3SiO_{1/2}$, where Me represents methyl, Ph represents phenyl and $R^6$ represents a hydrogen atom or alkyl radicals of 1 to 10 carbon atoms optionally substituted with halogen atoms, more preferably a hydrogen atom or alkyl radicals of 1 to 4 carbon atoms, while the resin preferably comprises 0-2 mol of (Q) units, 0-2 mol of (D) units and 0-2 mol of (M) units per mole of (T) units.

Preferred examples of silicone resins useful as components (F) are organopolysiloxane resins consisting essentially, preferably exclusively, of T units of the formulae $PhSiO_{3/2}$, $PhSi(OR^6)O_{2/2}$ and $PhSi(OR^6)_2O_{1/2}$, optionally T units of the formulae $MeSiO_{3/2}$, $MeSi(OR^6)O_{2/2}$ and $MeSi(OR^6)_2O_{1/2}$ and also optionally D units of the formulae $Me_2SiO_{2/2}$ and $Me_2Si(OR^6)O_{1/2}$, where Me represents methyl, Ph represents phenyl and $R^6$ represents a hydrogen atom or alkyl radicals of 1 to 10 carbon atoms optionally substituted with halogen atoms, more preferably a hydrogen atom or alkyl radicals of 1 to 4 carbon atoms, having a molar ratio of phenylsilicone to methylsilicone units in the range from 0.5 to 2.0. The level of D units in these silicone resins is preferably below 10 wt %.

Further preferred examples of silicone resins useful as components (F) are organopolysiloxane resins consisting essentially, preferably exclusively, of T units of the formulae $PhSiO_{3/2}$, $PhSi(OR^6)O_{2/2}$ and $PhSi(OR^6)_2O_{1/2}$, where Ph represents phenyl and $R^6$ represents a hydrogen atom or alkyl radicals of 1 to 10 carbon atoms optionally substituted with halogen atoms, more preferably a hydrogen atom or alkyl radicals of 1 to 4 carbon atoms.

The silicone resins useful as components (F) preferably have an average molar mass (number average) $M_n$ of at least 400 g/mol and more preferably of at least 600 g/mol. The average molar mass $M_n$ is preferably at most 400,000 g/mol, more preferably at most 100,000 g/mol and especially at most 50,000 g/mol. They can be both solid and liquid at 23° C. and 1000 hPa, in which case liquid silicone resins are preferred.

The silicone resins useful as components (F) are commercially available products, for example various SILRES® types from Wacker Chemie AG, such as SILRES® IC 368, SILRES® IC 678 or SILRES® SY231, and/or obtainable by common chemical methods.

When the compositions (M) of the present invention do comprise silicone resins (F), the amounts are of preferably 5 to 1000 parts by weight, more preferably 10 to 500 parts by weight, and especially at least 50 to 300 parts by weight, all based on 100 parts by weight of component (A).

Catalysts (G) optionally used in the compositions (M) of the present invention may comprise any desired previously known catalysts for compositions curing by silane condensation other than component (D).

Examples of metal-containing curing catalysts (G) are organic compounds of titanium and of tin, for example titanic esters, such as tetrabutyl titanate, tetrapropyl titanate, tetraisopropyl titanate and titanium tetraacetylacetonate; tin compounds such as dibutyltin dilaurate, dibutyltin maleate, dibutyltin diacetate, dibutyltin dioctanoate, dibutyltin acetylacetonate, dibutyltin oxides, and corresponding dioctyltin compounds.

Examples of metal-free curing catalysts (G) are basic compounds such as triethylamine, tributylamine, 1,4-diazabicyclo[2,2,2]octane, 1,5-diazabicyclo[4.3.0]non-5-ene, 1,8-diazabicyclo[5.4.0]undec-7-ene, N,N-bis(N,N-dimethyl-2-aminoethyl)methylamine, N,N-dimethylcyclohexylamine, N,N-dimethylphenylamine and N-ethylmorpholinine.

Useful catalysts (G) further include acidic compounds, such as phosphoric acid and its esters, toluenesulfonic acid, sulfuric acid, nitric acid or else organic carboxylic acids, for example acetic acid and benzoic acid.

In one mode of the invention, the optionally used catalysts (G) are metal-containing curing catalysts, preferably tin-containing catalysts. This embodiment of the invention is preferable in particular when component (A) consists wholly or at least partly, i.e., to an extent of at least 90% wt %, preferably to an extent of at least 95 wt %, of formula (I) compounds in which b is other than 1.

When the compositions (M) of the present invention do comprise catalysts (G), the amounts are preferably 0.01 to 20 parts by weight, more preferably 0.05 to 5 parts by weight, all based on 100 parts by weight of constituent (A).

Adhesion promoters (H) optionally used in the compositions (M) of the present invention may comprise any desired adhesion promoters hitherto described for systems curing by silane condensation.

Adhesion promoters (H) preferably comprise alkoxysilanes having at least one SiC-bonded reactive organic function, e.g., glycidoxyalkyl-, carbamatoalkyl- and methacryloyloxyalkyl-alkoxysilanes, and their partial hydrolyzates other than component (D).

Examples of adhesion promoters (H) are epoxysilanes, such as glycidoxypropyltrimethoxysilanes, glycidoxypropylmethyldimethoxysilane, glycidoxy-propyltriethoxysilane or glycidoxypropylmethyldiethoxysilane, 2-(3-triethoxysilylpropyl)maleic anhydride, N-(3-trimethoxysilylpropyl)urea, N-(3-triethoxysilylpropyl)urea, N-(trimethoxysilylmethyl)urea, N-(methyl dimethoxysilylmethyl)urea, N-(3-triethoxysilylmethyl)urea, N-(3-methyldiethoxysilylmethyl) urea, O-methylcarbamatomethylmethyldimethoxysilane, O-methylcarbamatomethyltrimethoxysilane, O-ethylcarbamatomethylmethyldiethoxysilane, O-ethylcarbamatomethyltriethoxysilane, 3-methacryloyloxypropyltrimethoxysilane, methacryloyloxymethyltrimethoxysilane, methacryloyloxymethylmethyldimethoxysilane, methacryloyloxymethyltriethoxysilane, methacryloyloxymethylmethyldiethoxysilane, 3-acryloyloxypropyltrimethoxysilane, acryloyloxymethyltrimethoxysilane, acryloyloxymethylmethyldimethoxysilanes, acryloyloxymethyltriethoxysilane and acryloyloxymethylmethyldiethoxysilane and also their partial condensates.

When the compositions (M) of the present invention do comprise adhesion promoters (H), the amounts are preferably 0.5 to 30 parts by weight, more preferably 1 to 10 parts by weight, all based on 100 parts by weight of component (A).

Water scavengers (I) optionally used in the compositions (M) of the present invention may comprise any desired water scavengers described for systems curing by silane condensation.

Water scavengers (I) preferably comprise alkoxysilanes and their partial hydrolyzates other than components (D) and (H).

Examples of water scavengers (I) are silanes such as vinyltrimethoxysilane, vinyltriethoxysilane, vinylmethyldimethoxysilane, O-methylcarbamatomethyl-methyldimethoxysilane, O-methylcarbamatomethyltrimethoxysilane, O-ethylcarbamatomethylmethyldiethoxysilane, O-ethylcarbamatomethyltriethoxysilane, and/or their partial condensates and also orthoesters, such as 1,1,1-trimethoxyethane, 1,1,1-triethoxyethane, trimethoxymethane and triethoxymethane.

When the compositions (M) of the present invention do comprise water scavengers (I), the amounts are preferably 0.5 to 30 parts by weight, more preferably 1 to 20 parts by weight, all based on 100 parts by weight of component (A). The compositions of the present invention preferably do comprise component (I).

Additives (J) optionally used in the compositions (M) of the present invention may comprise any desired, previously known additives typical for silane-crosslinking systems.

Additives (J) optionally used for the purposes of the present invention preferably comprise antioxidants, UV stabilizers, such as, for example so-called HALS compounds, fungicides and pigments.

When the compositions (M) of the present invention do comprise additives (J), the amounts are preferably 0.01 to 30 parts by weight, more preferably 0.1 to 10 parts by weight, all based on 100 parts by weight of component (A).

Admixture agents (K) optionally used for the purposes of the present invention preferably comprise tetraalkoxysilanes, e.g., tetraethoxysilane, and/or their partial condensates, reactive plasticizers, rheology additives, flame retardants and organic solvents.

Preferred reactive plasticizers (K) are compounds comprising alkyl chains of 6 to 40 carbon atoms and possessing a group which is reactive toward compounds (A). Examples are isooctyltrimethoxysilane, isooctyltriethoxysilane, N-octyltrimethoxysilane, N-octyltriethoxysilane, decyltrimethoxysilanes, decyltriethoxysilane, dodecyltrimethoxysilane, dodecyltriethoxysilane, tetradecyltrimethoxysilane, tetradecyltriethoxysilane, hexadecyltrimethoxysilane and also hexadecyltriethoxysilane.

Rheology additives (K) preferably comprise polyamide waxes, hydrogenated castor oils or stearates.

Examples of organic solvents (K) are low molecular weight ethers, esters, ketones, aromatic and aliphatic and also optionally halogen-containing hydrocarbons and alcohols, the latter being preferred.

The compositions (M) of the present invention are preferably not admixed with organic solvents.

When the compositions (M) of the present invention do comprise one or more components (K), the amounts in each case are of preferably 0.5 to 200 parts by weight, more preferably 1 to 100 parts by weight, especially 2 to 70 parts by weight, all based on 100 parts by weight of component (A).

The ingredients of compositions (M) all always add up to 100 wt %.

The compositions of the present invention preferably comprise
(A) compounds of formula (I),
(B) finely divided silica,
optionally
(C) nonreactive plasticizer,
optionally
(D) basic nitrogen compound,
optionally
(E) fillers,
optionally
(F) catalysts,
optionally
(H) adhesion promoters,
optionally
(I) water scavengers,
optionally
(J) additives, and
optionally
(K) admixture agents.

The compositions of the present invention more preferably comprise
(A) compounds of formula (I),
(B) finely divided silica,
(C) nonreactive plasticizer,
(D) basic nitrogen compound,
optionally
(E) fillers,
optionally
(F) catalysts,
optionally
(H) adhesion promoters,
optionally
(I) water scavengers,
optionally
(J) additives, and
optionally
(K) admixture agents.

Aside from components (A) to (K), the compositions (M) of the present invention preferably contain no further constituents.

The components used for the purposes of the present invention may each comprise one species of such a component as well as a mixture of two or more species of a particular component.

The compositions (M) of the present invention preferably comprise adhesive or sealant material, more preferably adhesive materials.

The compositions (M) of the present invention preferably have viscosities of 500 to 1,000,000 mPas, more preferably 1000 to 500,000 mPas, all at 25° C.

The compositions (M) of the present invention are obtainable in any desired manner known per se, for instance by procedures and mixing methods of the kind customary for producing moisture-curing compositions.

The present invention further provides a method of producing the compositions (M) of the present invention by mixing the individual components in any desired order.

This mixing may be carried out at room temperature and the pressure of the ambient atmosphere, i.e., about 900 to 1100 hPa. If desired, however, this mixing can also take place at higher temperatures, for example at temperatures in the range from 30 to 130° C. It is further possible for the mixing to be temporarily or constantly done under reduced pressure, for example at 30 to 500 hPa absolute pressure, in order to remove volatile compounds and/or air.

The mixing of the present invention preferably takes place in the absence of moisture.

The method of the present invention may be carried out as a continuous operation or as a batch operation.

The compositions (M) of the present invention preferably comprise single-component compositions which are storable in the absence of moisture and capable of crosslinking at room temperature on admittance of water. However, the compositions (M) of the present invention may also be part of two-component crosslinking systems where OH-containing compounds, such as water, are added in a second component.

The customary water content of air is sufficient to crosslink the compositions (M) of the present invention. The crosslinking of the compositions (M) according to the present invention preferably takes place at room temperature. If desired, it can also be carried out at temperatures higher or lower than room temperature, for example at from −5° to 15° C. or at from 30° to 50° C. and/or by means of concentrations of water which exceed or fall short of the normal water content of air.

Crosslinking is preferably carried out at a pressure of 100 to 1100 hPa, in particular at the pressure of the surrounding atmosphere, i.e., about 900 to 1100 hPa.

The invention further provides shaped articles obtained by crosslinking the compositions (M) of the present invention.

The shaped articles of the present invention may comprise any desired shaped articles, for instance gaskets, press moldings, extruded profiles, coatings, impregnations, encapsulation, lenses, prisms, polygonal structures, laminate layers or adhesive layers.

The compositions (M) of the present invention have post-cure tensile strengths >5 MPa, preferably >7 MPa, more preferably >8 MPa.

The cured compositions (M) of the present invention have elongations at break of preferably >100%, more preferably >150%, especially >200%.

The cured compositions (M) of the present invention preferably exhibit tensile strengths >5 MPa in combination with elongations at break >100%, more preferably tensile strengths >5 MPa in combination with elongations at break >150%, in particular with elongations at break >200%.

The invention further provides a method of adhesively bonding substrates, which comprises the composition of the present invention being applied atop the surface of at least one substrate, this surface then being brought into contact with the second adherend substrate and subsequently being allowed to crosslink.

Examples of substrates adhesively bondable according to the present invention are wood in particular, but also plastics including PVC, concrete, mineral substrates, metals, glass, ceramics and painted surfaces. Materials both alike and different may be adhesively bonded together. One example of a preferred use for adhesives according to the present invention is the bonding together of adherends which may become exposed to a severe vibration, for example the adhesive bonding of windshields.

The invention further provides a method of forming composites, which comprises the composition of the present invention being applied atop at least one substrate and then being allowed to crosslink. Examples thereof are coatings, encapsulation, e.g., encapsulation compounds for LEDs or other electronic components, the manufacture of formed articles, composite materials and composite moldings. By composite moldings herein are meant a unitary article formed from a composite material and composed of a crosslinked product of compositions (M) according to the present invention and at least one substrate such that there is a firm, durable bond between the two parts.

The compositions (M) of the present invention have the advantage of being obtainable from inexpensive materials that are easily and commercially straightforwardly accessible, in particular from commercially available silane-crosslinking polymers, for example from the various GENIOSIL® STP-E types from Wacker Chemie AG.

The crosslinkable compositions (M) of the present invention have the advantage of a very high stability in storage and a high rate of crosslinking. The crosslinkable compositions (M) of the present invention further have the advantage of an outstanding profile of adherence. The compositions (M) of the present invention further have the advantage of being easily processable, and have the further advantage that adhesives possessing high tensile strength and high elasticity, i.e., a high elongation at break, are obtainable therefrom.

The compositions of the present invention also have the advantage of making possible the use of long-chain, and hence correspondingly high molecular weight, silane-crosslinking polymers as needed to achieve high elasticities, i.e., elongations at break >100%, without their use automatically leading to very moderate tensile strengths, i.e., to tensile strengths below 5 MPa. Thus, the systems of the present invention make possible the development of adhesives combining high tensile strength with high elasticity.

Examples will now be described where reported viscosities all relate to a temperature of 25° C. Unless stated otherwise, the examples hereinbelow are carried out at a pressure of the surrounding atmosphere, i.e., for instance at 1000 hPa, and at room temperature, i.e., at about 23° C., or at a temperature which becomes established when the reactants are added together at room temperature without additional heating or cooling, and also at a relative humidity of about 50%. Parts and percentages are further all by weight, unless otherwise stated.

EXAMPLE 1

Example 1 shows the dependence of the mechanical properties of the cured formulations of adhesive, in particular the dependence of their tensile strengths, on the proportion of pyrogenous silica in the crosslinkable composition.

Adhesive Formulation 1a 111.6 g of an α,ω-silane-terminated linear polypropylene glycol having an average molar mass ($M_n$) of 18,000 g/mol and end groups of the formula —O—C(=O)—NH—$(CH_2)_3$—$Si(OCH_3)_3$ (commercially available from Wacker Chemie AG under the designation GENIOSIL® STP-E35) are homogenized at 25° C. with 5.6 g of vinyltrimethoxysilane and 27.4 g of a polypropylene glycol having an average molar mass ($M_e$) of 2000 g/mol by stirring for 2 minutes in a laboratory planetary mixer from PC-Laborsystem, equipped with two beam mixers, at 200 rpm. Thereafter, 50.0 g of a hydrophobic pyrogenic silica having a BET surface area of about 140 m$^2$/g (HDK® H 2000, commercially available from Wacker Chemie AG) are destructurized by stirring at 600 rpm for one minute. Finally, 5.0 g of N-(2-aminoethyl)-3-aminopropyltrimethoxysilane and 0.4 g of dioctyltin dilaurate are mixed in at 200 rpm for 1 minute. This is lastly followed by stirring for 2 minutes at 600 rpm and for 1 minute at 200 rpm at a pressure of 100 mbar to achieve homogenization and removal of bubbles.

The composition thus obtained is dispensed into 310 ml PE cartridges and stored for 24 hours at 20° C. before testing.

Adhesive Formulation 1b

The procedure described above under adhesive formulation 1a is repeated except that 119.6 g of the α,ω-silane-terminated linear polypropylene glycol having an average molar mass ($M_n$) of 18,000 g/mol and end groups of the formula —O—C(=O)—NH—(CH$_2$)$_3$—Si(OCH$_3$)$_3$, 5.6 g of vinyltrimethoxysilane, 29.4 g of a polypropylene glycol having an average molar mass ($M_n$) of 2000 g/mol, 40.0 g of a hydrophobic pyrogenic silica having a BET surface area of about 140 m$^2$/g is destructured for one minute by stirring at 600 rpm, and 5.0 g of N-(2-aminoethyl)-3-aminopropyltrimethoxysilane and 0.4 g of dioctyltin dilaurate are added.

COMPARATIVE EXAMPLE 1 (V1)

Adhesive Formulation 1c

The procedure described in Example 1a is repeated except that 127.6 g of the α,ω-silane-terminated linear polypropylene glycol having an average molar mass ($M_n$) of 18,000 g/mol and end groups of the formula —O—C(=O)—NH—(CH$_2$)$_3$—Si(OCH$_3$)$_3$, 5.6 g of vinyltrimethoxysilane, 31.4 g of a polypropylene glycol having an average molar mass ($M_n$) of 2000 g/mol, 30.0 g of a hydrophobic pyrogenic silica having a BET surface area of about 140 m$^2$/g, 5.0 g of N-(2-aminoethyl)-3-aminopropyltrimethoxysilane and 0.4 g of dioctyltin dilaurate are used.

Determining the Properties of Adhesive Formulations 1a, 1b and 1c

The compositions obtained in Examples 1a to 1c were allowed to crosslink and tested with regard to their skin formation and their mechanical properties. The results are found in table 1.

Skin Formation Time (SFT)

To determine their skin formation time, the crosslinkable compositions obtained in the examples are applied in a 2 mm thick layer atop PE foil and stored under standard conditions (23° C. and 50% relative humidity). During cure, the formation of a skin is tested for every 5 min. To this end, a dry laboratory spatula is carefully placed on the surface of the sample and pulled in the upward direction. If the sample sticks to the spatula, a skin is yet to form. If the sample does not any longer stick to the spatula, a skin has formed and the time is recorded.

Mechanical Properties

The compositions were each spread out on milled Teflon plates to a depth of 2 mm and cured at 23° C., 50% relative humidity, for 2 weeks.

Tensile strength is determined in accordance with DIN 53504-S1.

Elongation at break is determined in accordance with DIN 53504-S1.

Shore hardness A is determined in accordance with DIN 53505.

The results are found in table 1.

TABLE 1

| Example | 1 | | V1 |
|---|---|---|---|
| adhesive formulation | 1a | 1b | 1c |
| pyrogenic silica content [wt %] | 25 | 20 | 15 |
| skin formation time [min] | 13 | 20 | 23 |
| tensile strength [MPa] | 8.2 | 6.5 | 3.5 |
| elongation at break [%] | 304 | 306 | 249 |
| Shore hardness A | 65 | 60 | 54 |

EXAMPLE 2

Example 2 shows the dependence of the mechanical properties of the cured adhesive formulations on the proportion of plasticizer in the crosslinkable composition.

Adhesive Formulation 2a 66.0 g of an α,ω-silane-terminated linear polypropylene glycol having an average molar mass (Me) of 18,000 g/mol and end groups of the formula —O—C(=O)—NH—(CH$_2$)$_3$—Si(OCH$_3$)$_3$ (commercially available from Wacker Chemie AG under the designation GENIOSIL® STP-E35) are homogenized at 25° C. with 5.6 g of vinyltrimethoxysilane and 66.0 g of a polypropylene glycol having an average molar mass ($M_n$) of 2000 g/mol by stirring for 2 minutes in a laboratory planetary mixer from PC-Laborsystem, equipped with two beam mixers, at 200 rpm. Thereafter, 57.0 g of a hydrophobic pyrogenous silica having a BET surface area of about 140 m$^2$/g (HDK® H 2000, commercially available from Wacker Chemie AG) are destructurized by stirring at 600 rpm for one minute. Finally, 5.0 g of N-(2-aminoethyl)-3-aminopropyltrimethoxysilane and 0.4 g of dioctyltin dilaurate are mixed in at 200 rpm for 1 minute. This is lastly followed by stirring for 2 minutes at 600 rpm and for 1 minute at 200 rpm at a pressure of 100 mbar to achieve homogenization and removal of bubbles.

The composition thus obtained is dispensed into 310 ml PE cartridges and stored for 24 hours at 20° C. before testing.

Adhesive Formulation 2b

The procedure described above under 2a is repeated except that 86.0 g of the α,ω-silane-terminated linear polypropylene glycol having an average molar mass ($M_n$) of 18,000 g/mol and end groups of the formula —O—C(=O)—NH—(CH$_2$)$_3$—Si(OCH$_3$)$_3$, 5.6 g of vinyltrimethoxysilane, 46.0 g of a polypropylene glycol having an average molar mass ($M_n$) of 2000 g/mol, 57.0 g of a hydrophobic pyrogenic silica having a BET surface area of about 140 m$^2$/g, 5.0 g of N-(2-aminoethyl)-3-aminopropyltrimethoxysilane and 0.4 g of dioctyltin dilaurate are used.

Adhesive Formulation 2c

The procedure described above under 2a is repeated except that 106.0 g of the α,ω-silane-terminated linear polypropylene glycol having an average molar mass ($M_n$) of 18,000 g/mol and end groups of the formula —O—C(=O)—NH—(CH$_2$)$_3$—Si(OCH$_3$)$_3$, 5.6 g of vinyltrimethoxysilane, 26.0 g of a polypropylene glycol having an average molar mass ($M_n$) of 2000 g/mol, 57.0 g of a hydrophobic pyrogenic silica having a BET surface area of about 140 m$^2$/g, 5.0 g of N-(2-aminoethyl)-3-aminopropyltrimethoxysilane and 0.4 g of dioctyltin dilaurate are used.

Adhesive Formulation 2d

The procedure described above under 2a is repeated except that 126.0 g of the α,ω-silane-terminated linear polypropylene glycol having an average molar mass ($M_n$) of 18,000 g/mol and end groups of the formula —O—C(=O)—NH—($CH_2$)$_3$—Si(OCH$_3$)$_3$, 5.6 g of vinyltrimethoxysilane, 57.0 g of a hydrophobic pyrogenous silica having a BET surface area of about 140 m$^2$/g, 5.0 g of N-(2-aminoethyl)-3-aminopropyltrimethoxysilane and 0.4 g of dioctyltin dilaurate are used. The addition of a polypropylene glycol as plasticizer is eschewed in this adhesive formulation.

Determining the properties of adhesive formulations 2a, 2b, 2c and 2d

Skin formation time and mechanical properties were determined exactly as described in Example 1. The results are found in table 2.

TABLE 2

| Example | 2 | | | |
|---|---|---|---|---|
| adhesive formulation | 2a | 2b | 2c | 2d |
| plasticizer content [wt %] | 33 | 23 | 13 | 0 |
| skin formation time [min] | 19 | 18 | 17 | 17 |
| tensile strength [MPa] | 6.3 | 8.4 | 9.9 | 7.8 |
| elongation at break [%] | 355 | 325 | 304 | 201 |
| Shore hardness A | 57 | 64 | 67 | 73 |

EXAMPLE 3

Example 3 describes adhesive formulations comprising different prepolymers.

Adhesive Formulation 3a 66.0 g of an α,ω-silane-terminated linear polypropylene glycol having an average molar mass ($M_n$) of 12,000 g/mol and end groups of the formula —O—C(=O)—NH—($CH_2$)$_3$—Si(OCH$_3$)$_3$ (commercially available from Wacker Chemie AG under the designation GENIOSIL® STP-E35) are homogenized at 25° C. with 5.6 g of vinyltrimethoxysilane and 66.0 g of a polypropylene glycol having an average molar mass ($M_n$) of 2000 g/mol by stirring for 2 minutes in a laboratory planetary mixer from PC-Laborsystem, equipped with two beam mixers, at 200 rpm. Thereafter, 57.0 g of a hydrophobic pyrogenic silica having a BET surface area of about 140 m$^2$/g (HDK® H 2000, commercially available from Wacker Chemie AG) are destructurized by stirring at 600 rpm for one minute. Finally, 5.0 g of N-(2-aminoethyl)-3-aminopropyltrimethoxysilane and 0.4 g of dioctyltin dilaurate are mixed in at 200 rpm for 1 minute. This is lastly followed by stirring for 2 minutes at 600 rpm and for 1 minute at 200 rpm at a pressure of 100 mbar to achieve homogenization and removal of bubbles.

The composition thus obtained is dispensed into 310 ml PE cartridges and stored for 24 hours at 25° C. before testing.

Adhesive Formulation 3b

The procedure described above under 3a is repeated except that 106.0 g of an α,ω-silane-terminated linear polypropylene glycol having an average molar mass ($M_n$) of 18,000 g/mol and end groups of the formula —O—C(=O)—NH—CH$_2$—Si(OCH$_3$)$_3$ (commercially available from Wacker Chemie AG under the designation GENIOSIL® STP-E30), 6.0 g of vinyltrimethoxysilane, 26.0 g of a polypropylene glycol having an average molar mass ($M_n$) of 2000 g/mol, 57.0 g of a hydrophobic pyrogenic silica having a BET surface area of about 140 m$^2$/g and 5.0 g of N-(2-aminoethyl)-3-aminopropyltrimethoxysilane are used. The addition of a further catalyst can be eschewed in this formulation, which is based on a so-called α-silane-terminated polymer.

Determining the properties of adhesive formulations 3a and 3b

Skin formation time and mechanical properties are determined exactly as described in Example 1. The results are found in table 3.

TABLE 3

| Example | 3 | |
|---|---|---|
| adhesive formulation | 3a | 3b |
| prepolymer type | GENIOSIL® STP-E15 | GENIOSIL® STP-E30 |
| skin formation time [min] | 21 | 6 |
| tensile strength [MPa] | 5.9 | 7.2 |
| elongation at break [%] | 214 | 313 |
| Shore hardness A | 55 | 63 |

EXAMPLE 4

Example 4 describes adhesive formulations comprising various types of silica.

Adhesive Formulation 4a 103.0 g of an α,ω-silane-terminated linear polypropylene glycol having an average molar mass ($M_n$) of 18,000 g/mol and end groups of the formula —O—C(=O)—NH—($CH_2$)$_3$—Si(OCH$_3$)$_3$ (commercially available from Wacker Chemie AG under the designation GENIOSIL® STP-E35) are homogenized at 25° C. with 3.0 g of vinyltrimethoxysilane and 23.0 g of a polypropylene glycol having an average molar mass ($M_n$) of 2000 g/mol by stirring for 2 minutes in a laboratory planetary mixer from PC-Laborsystem, equipped with two beam mixers, at 200 rpm. Thereafter, 65.6 g of a hydrophilic pyrogenic silica having a BET surface area of about 50 m$^2$/g (HDK® D 05, commercially available from Wacker Chemie AG) are destructurized by stirring at 600 rpm for one minute. Finally, 5.0 g of N-(2-aminoethyl)-3-aminopropyltrimethoxysilane and 0.4 g of dioctyltin dilaurate are mixed in at 200 rpm for 1 minute. This is lastly followed by stirring for 2 minutes at 600 rpm and for 1 minute at 200 rpm at a pressure of 100 mbar to achieve homogenization and removal of bubbles.

The composition thus obtained is dispensed into 310 ml PE cartridges and stored for 24 hours at 25° C. before testing.

Adhesive Formulation 4b

The procedure described above under 4a is repeated except that 113.0 g of an α,ω-silane-terminated linear polypropylene glycol having an average molar mass ($M_n$) of 18,000 g/mol and end groups of the formula —O—C(=O)—NH—CH$_2$—Si(OCH$_3$)$_3$ (commercially available from Wacker Chemie AG under the designation GENIOSIL® STP-E30), 6.0 g of vinyltrimethoxysilane, 33.0 g of a polypropylene glycol having an average molar mass ($M_n$) of 2000 g/mol, 43.0 g of a hydrophilic pyrogenic silica having a BET surface area of about 100 m$^2$/g (HDK° C. 10, commercially available from Wacker Chemie AG) and 5.0 g of N-(2-aminoethyl)-3-aminopropyltrimethoxysilane are used. The addition of a further catalyst can be eschewed in this formulation, which is based on a so-called α-silane-terminated polymer.

Determining the Properties of Adhesive Formulations 4a and 4b

Skin formation time and mechanical properties are determined exactly as described in Example 1. The results are found in table 4.

TABLE 4

| Example | 4 | |
|---|---|---|
| adhesive formulation | 4a | 4b |
| silica type | HDK® D 05 | HDK® C 10 |
| skin formation time [min] | 15 | 5 |
| tensile strength [MPa] | 5.0 | 6.1 |
| elongation at break [%] | 107 | 352 |
| Shore hardness A | 63 | 50 |

EXAMPLE 5

Example 5 shows the effects of further additives on the mechanical properties of the resulting compositions after their cure.

Adhesive Formulation 5a 104.0 g of an α,ω-silane-terminated linear polypropylene glycol having an average molar mass (Me) of 18 000 g/mol and end groups of the formula —O—C(=O)—NH—(CH$_2$)$_3$—Si(OCH$_3$)$_3$ (commercially available from Wacker Chemie AG under the designation GENIOSIL® STP-E35) are homogenized at about 25° C. with 4.6 g of vinyltrimethoxysilane and 24.0 g of a polypropylene glycol having an average molar mass (M$_e$) of 2000 g/mol and 5 g of a solvent-free, liquid phenylsilicone resin that is composed of phenyl-functional T units (50-75 mol %) and dimethyl-functional D units (25-50 mol %) and has an alkoxy group content of 10-30 wt % (commercially available from Wacker Chemie AG under the designation of SILRES® SY 231) by stirring for 2 minutes in a laboratory planetary mixer from PC-Laborsystem, equipped with two beam mixers, at 200 rpm. Thereafter, 57.0 g of a hydrophobic pyrogenic silica having a BET surface area of about 140 m$^2$/g (HDK® H 2000, commercially available from Wacker Chemie AG) are destructurized by stirring at 600 rpm for one minute. Finally, 5.0 g of N-(2-aminoethyl)-3-aminopropyltrimethoxysilane and 0.4 g of dioctyltin dilaurate are mixed in at 200 rpm for 1 minute. This is lastly followed by stirring for 2 minutes at 600 rpm and for 1 minute at 200 rpm at a pressure of 100 mbar to achieve homogenization and removal of bubbles.

The composition thus obtained is dispensed into 310 ml PE cartridges and stored for 24 hours at 25° C. before testing.

Adhesive Formulation 5b

The procedure described above under 5a is repeated except that 104.0 g of an α,ω-silane-terminated linear polypropylene glycol having an average molar mass (M$_n$) of 18,000 g/mol and end groups of the formula —O—C(=O)—NH—(CH$_2$)$_3$—Si(OCH$_3$)$_3$, 4.6 g of vinyltrimethoxysilane, 24.0 g of a polypropylene glycol having an average molar mass (M$_n$) of 2000 g/mol, 5 g of a solvent-free, liquid phenylsilicone resin that is composed of phenyl-functional T units (60-65 wt %) and methyl-functional T units (18-22 wt %) and dimethyl-functional D units (2-4 wt %) and has a methoxy group content of 12-16 wt % and an average molar mass of 800-1300 daltons (commercially available from Wacker Chemie AG under the designation of SILRES® IC 368), 57.0 g of a hydrophobic pyrogenic silica having a BET surface area of about 140 m$^2$/g, 5.0 g of N-(2-aminoethyl)-3-aminopropyltrimethoxysilane and 0.4 g of dioctyltin dilaurate are used.

Adhesive Formulation 5c

The procedure described above under 5a is repeated except that 104.0 g of an α,ω-silane-terminated linear polypropylene glycol having an average molar mass (M$_n$) of 18,000 g/mol and end groups of the formula —O—C(=O)—NH—(CH$_2$)$_3$—Si(OCH$_3$)$_3$, 4.6 g of vinyltrimethoxysilane, 5 g of glycidoxypropyltrimethoxysilane (commercially available from Wacker Chemie AG under the designation of GENIOSIL® GF 80), 24.0 g of a polypropylene glycol having an average molar mass (Me) of 2000 g/mol, 57.0 g of a hydrophobic pyrogenic silica having a BET surface area of about 140 m$^2$/g, 5.0 g of N-(2-aminoethyl)-3-aminopropyltrimethoxysilane and 0.4 g of dioctyltin dilaurate are used.

Adhesive Formulation 5d

The procedure described above under 5a is repeated except that 106.0 g of an α,ω-silane-terminated linear polypropylene glycol having an average molar mass (M$_n$) of 18,000 g/mol and end groups of the formula —O—C(=O)—NH—(CH$_2$)$_3$—Si(OCH$_3$)$_3$, 5.6 g of vinyltrimethoxysilane, 26.0 g of a polypropylene glycol having an average molar mass (M$_n$) of 2000 g/mol, 57.0 g of a hydrophobic pyrogenic silica having a BET surface area of about 140 m$^2$/g, 3.0 g of N-(2-aminoethyl)-3-aminopropyltrimethoxysilane, 2 g of N-cyclo-hexylaminomethylmethyldiethoxysilane (commercially available from Wacker Chemie AG under the designation of GENIOSIL® XL 924) and 0.4 g of dioctyltin dilaurate are used.

Determining the Properties of Adhesive Formulations 5a, 5b, 5c and 5d

Skin formation time and mechanical properties are determined exactly as described in Example 1. The results are found in table 5.

TABLE 5

| Example | 5 | | | |
|---|---|---|---|---|
| adhesive formulation | 5a | 5b | 5c | 5d |
| further addition | phenyl-silicone resin | phenyl-silicone resin | glycidoxy-silane | cyclo-hexylamino-silane |
| skin formation time [min] | 12 | 12 | 15 | 16 |
| tensile strength [MPa] | 11.2 | 9.9 | 5.0 | 11.8 |
| elongation at break [%] | 363 | 305 | 106 | 420 |
| Shore hardness A | 71 | 68 | 81 | 64 |
| tensile shear strength (Al/Al) [MPa] | 10 | 11.1 | 6.8 | 7.8 |
| tensile shear strength (wood/wood) [MPa] | 5.1 | 7.4 | 7.4 | 7.3 |

What is claimed is:
1. A composition, comprising:
(A) at least one silane-crosslinking polymer of the formula

Y—[(CR$^1_2$)$_b$—SiR$_a$(OR$^2$)$_{3-a}$]$_x$    (I)

where
Y comprises a polyurethane or polyoxyalkylene polymer residue which is x-valent and attached to (CR$^1_2$) via nitrogen, oxygen, sulfur or carbon,
R each independently is a monovalent, optionally substituted hydrocarbyl radical,
R$^1$ each independently is hydrogen or a monovalent, optionally substituted hydrocarbyl radical optionally attached to the carbon atom of the $CR^1_2$ group via nitrogen, phosphorus, oxygen, sulfur or a carbonyl group, $R^2$ each individually is hydrogen or a monovalent, optionally substituted hydrocarbyl radical, x is an integer from 1 to 10, a each individually is 0, 1 or 2, and b each individually is an integer from 1 to 10, (B) finely divided silica comprising pyrogenic silica having a BET surface area of between 50 m²/g to 200 m²/g, and (D) at least one basic nitrogen organosilicon compound comprising units of the formula $$D_c Si(OR^3)_d R^4_e O_{(4-c-d-e)/2} \quad (V),$$

where $R^3$ each individually is hydrogen or an optionally substituted hydrocarbyl radical, D each individually is a monovalent SiC-bonded radical with basic nitrogen, $R^4$ each individually is a monovalent, optionally substituted SiC-bonded organic radical free from basic nitrogen, c is 0, 1, 2, 3 or 4, d is 0, 1, 2 or 3, and e is 0, 1, 2 or 3, with the proviso that the sum total of c+d+e is not more than 4 and at least one D radical is present per molecule, and with the further proviso that silane-crosslinking polymer(s) (A) have an average molar mass $M_n$ (number average) of at least 8000 g/mol and at most 30,000 g/mol, the composition comprises finely divided silica in an amount of 16 to 50 wt %, based on the overall weight of the composition, and which when cured exhibits a tensile strength >5 MPa and an elongation at break, with the additional proviso that carbon black is excluded from the composition >100%.

2. The composition of claim 1, wherein c is 1.

3. The composition of claim 1, wherein d is 1, 2, or 3.

4. The composition of claim 1, wherein e is 1 or 0.

5. The composition of claim 1, comprising finely divided silica (B) in a concentration of at least 19 wt % and at most 40 wt %, based on the overall weight of composition.

6. The composition of claim 1, wherein the finely divided pyrogenic silica has a BET surface area of from greater than 50 m²/g to about 140 m²/g.

7. The composition of claim 1, further comprising at least one nonreactive plasticizer.

8. The composition of claim 7, wherein the plasticizer is present in a concentration of at least 5 wt % and at most 50 wt %, based on the overall weight of composition.

9. A method of forming a composition of claim 1, comprising mixing the individual components in any desired order.

10. A shaped article obtained by crosslinking a composition of claim 1.

11. A method of adhesively bonding substrates, comprising applying a composition of claim 1 onto the surface of at least one substrate, and then contacting this surface with a second substrate, and subsequently allowing the composition to crosslink.

12. A method of forming composites, which comprises applying a composition of claim 1 onto at least one substrate and then allowing the composition to crosslink.

13. A method of forming a composite, comprising applying a composition prepared by the method of claim 9 onto at least one substrate and crosslinking the composition.

14. The composition of claim 1, wherein b is 1, and the composition is free of metal catalysts.

15. The composition of claim 1, further comprising a polyoxyalkylene polyether plasticizer.

16. The composition of claim 7, wherein the plasticizer is present in an amount of from 10 to 40 weight percent based on the total weight of the composition, and the composition, when cured, exhibits properties of tensile strengh, elongation, or both tensile strength and elongation higher than the property or properties of a composition which is identical except for containing no plasticizer.

17. The composition of claim 1, further comprising at least one silicone resin, the silicone resin being present in an amount of from 5 to 1000 parts by weight relative to 100 parts by weight of component A.

18. A composition, comprising:

(A) optionally, at least one silane-crosslinking polymer of the formula $$Y\text{---}[(CR^1_2)_b\text{---}SiR_a(OR^2)_{3-a}]_x \quad (I)$$

where

Y comprises a polyurethane or polyoxyalkylene polymer residue which is x-valent and attached to $(CR^1_2)$ via nitrogen, oxygen, sulfur or carbon, R each independently is a monovalent, optionally substituted hydrocarbyl radical, $R^1$ each independently is hydrogen or a monovalent, optionally substituted hydrocarbyl radical optionally attached to the carbon atom of the $CR^1_2$ group via nitrogen, phosphorus, oxygen, sulfur or a carbonyl group, $R^2$ each individually is hydrogen or a monovalent, optionally substituted hydrocarbyl radical, x is an integer from 1 to 10, a each individually is 0, 1 or 2, and b each individually is an integer from 1 to 10, at least one silane-crosslinking polymer of the formula $$Y\text{---}[CR^1_2\text{---}SiR_a(OR^2)_{3-a}]_x \quad (Ia),$$

where

Y comprises a polyurethane or polyoxyalkylene polymer residue which is x-valent and attached to $(CR^1_2)$ via nitrogen, oxygen, sulfur or carbon, R each independently is a monovalent, optionally substituted hydrocarbyl radical, $R^1$ each independently is hydrogen or a monovalent, optionally substituted hydrocarbyl radical optionally attached to the carbon atom of the $CR^1_2$ group via nitrogen, phosphorus, oxygen, sulfur or a carbonyl group, $R^2$ each individually is hydrogen or a monovalent, optionally substituted hydrocarbyl radical, x is an integer from 1 to 10, a each individually is 0, 1 or 2, and b each individually is an integer from 2 to 10, (B) finely divided silica comprising pyrogenic silica having a BET surface area of between 50 m²/g to 200 m²/g, and (D) at least one basic nitrogen organosilicon compound comprising units of the formula $$D_c Si(OR^3)_d R^4_e O_{(4-c-d-e)/2} \quad (V),$$

where $R^3$ each individually is hydrogen or an optionally substituted hydrocarbyl radical, D each individually is a monovalent SiC-bonded radical with basic nitrogen, R⁴ each individually is a monovalent, optionally substituted SiC-bonded organic radical free from basic nitrogen, c is 0, 1, 2, 3 or 4, d is 0, 1, 2 or 3, and e is 0, 1, 2 or 3, with the proviso that the sum total of c+d+e is not more than 4 and at least one D radical is present per molecule, and with the further proviso that silane-crosslinking polymer(s) (A) have an average molar mass $M_n$ (number average) of at least 8000 g/mol and at most 30,000 g/mol, the composition comprises finely divided silica in an amount of 16 to 50 wt %, based on the overall weight of the composition, and the composition, when cured, has an elongation >100% with the additional proviso that carbon black is excluded from the composition.

19. The composition of claim 18 wherein no silane-crosslinking polymer of formula I is present.

20. The composition of claim 18, wherein silane crosslinking polymers of the formulae I and Ia are both present, in a weight ratio of Ia:I of 0.1 to 10.

21. The composition of claim 18, which when cured exhibits a tensile strength >5 Mpa.

22. The composition of claim 18, wherein b is 1, and the composition is free of metal catalysts.

23. The composition of claim 18, further comprising a polyoxyalkylene polyether plasticizer, and the composition, when cured, exhibits properties of tensile strengh, elongation, or both tensile strength and elongation higher than the property or properties of a composition which is identical except for containing no plasticizer.

24. The composition of claim 18, further comprising at least one silicone resin, the silicone resin being present in an amount of from 5 to 1000 parts by weight relative to 100 parts by weight of component A.

25. The composition of claim 1, wherein the tensile strength of the composition following curing, is >7 MPa.

26. The composition of claim 1, wherein the tensile strength of the composition following curing, is >8 MPa.

27. The composition of claim 25, wherein the elongation at break of the composition following curing is >200%.

28. The composition of claim 25, wherein the elongation at break of the composition following curing is >300%.

29. The composition of claim 1, wherein the silica (B) has BET surface area from >50 m²/g to 140m²/g.

30. The composition of claim 1, wherein the basic nitrogen organosilicon compound is selected from the group consisting of:

$H_2N(CH_2)_2NH(CH_2)_3$—$Si(OCH_3)_3$,
$H_2N(CH_2)_2NH(CH_2)_3$—$Si(OC_2H_5)_3$, $H_2N(CH_2)_2NH(CH_2)_3$—$Si(OCH_3)_2CH_3$,
$H_2N(CH_2)_2NH(CH_2)_3$—$Si(OC_2H_5)_2CH_3$, $H_2N(CH_2,)NH_2N(CH_2)_2NH(CH_2)_3$—$Si(OH)_3$,
$H_2N(CH_2)_2NH(CH_2)_3$—$Si(OH)_2CH_3$,$H_2N(CH_2)_2NH(CH_2)_2NH(CH_2)_3$—$Si(OCH_3)_3$,
$H_2N(CH_2)_2NH(CH_2)_2NH(CH_2)_3$—$Si(OC_2H_5)_3$.

* * * * *